United States Patent
Miller

[19]

[11] Patent Number: 6,113,233
[45] Date of Patent: Sep. 5, 2000

[54] LENS COVER SYSTEM

[75] Inventor: Robert G. Miller, 2725 Surfside Dr., Villa Hills, Ky. 41017-1075

[73] Assignee: Robert G. Miller, Villa Hills, Ky.

[21] Appl. No.: 09/336,520

[22] Filed: Jun. 18, 1999

Related U.S. Application Data

[63] Continuation-in-part of application No. 09/200,085, Nov. 25, 1998, abandoned.

[51] Int. Cl.[7] .................................................. G02C 7/16
[52] U.S. Cl. .................................. 351/46; 351/44; 351/47
[58] Field of Search ................................ 351/44, 45, 46, 351/47, 57, 63, 41; 2/454; 206/316.1

[56] References Cited

U.S. PATENT DOCUMENTS

| | | | |
|---|---|---|---|
| D. 284,867 | 7/1986 | Takatsuji | D16/123 |
| 3,628,854 | 12/1971 | Jampolsky | 351/175 |
| 4,018,515 | 4/1977 | Derkas | 351/47 |
| 4,729,650 | 3/1988 | Jennings | 351/47 |
| 4,955,709 | 9/1990 | Smith | 351/46 |
| 5,123,724 | 6/1992 | Salk | 351/57 |
| 5,321,442 | 6/1994 | Albanese | 351/44 |
| 5,321,443 | 6/1994 | Huber et al. | 351/47 |
| 5,464,094 | 11/1995 | La Haye | 206/316.1 |
| 5,642,177 | 6/1997 | Nishioka | 351/47 |
| 5,764,333 | 6/1998 | Somsel | 351/47 |
| 5,829,507 | 11/1998 | Pawlowski | 160/368.1 |

*Primary Examiner*—Hung Xuan Dang
*Attorney, Agent, or Firm*—Emerson & Associates; Roger D. Emerson; Timothy D. Bennett

[57] ABSTRACT

A lens cover system is provided. The lens cover system includes a sheet of material suitable for use in covering a first lens, a pin suitable for use in making a first plurality of holes in the sheet of material around the perimeter of the first lens, and a pair of scissors for cutting the sheet of material along the first plurality of holes thereby creating a first lens cover. The lens cover system also includes a storage apparatus for storing each lens cover. In one embodiment, the storage apparatus includes a card having first and second sides and an envelope. Each lens cover adheres to opposite sides of the card. The card and lens covers are then placed within the envelope for protection. In another embodiment the storage apparatus includes a book having a plurality of pages including first and second outer pages and a middle page. Each lens cover adheres to opposite sides of the middle page. The outer pages are then closed around the middle page for protection. Preferably, the card and envelope and the book fit within a credit card holder for easy and convenient storage.

19 Claims, 7 Drawing Sheets

LENS COVER SYSTEM

This is a Continuation-In-Part Application claiming priority from U.S. application Ser. No. 09/200,085, filed Nov. 25, 1998 now abandoned.

BACKGROUND OF THE INVENTION

1. Field of Invention

This invention pertains to the art of apparatuses and methods for eye protection and more specifically to the art of providing and storing lens covers for eyeglass lenses.

2. Description of the Related Art

Protecting eyes from the sun with sunglasses is well known. A problem occurs, however, for those who wear corrective eyeglasses. A corrective eyeglass wearer has basically three known options for protecting his eyes from the sun. One option is to obtain a separate pair of corrective sunglasses. This option is expensive and requires the wearer to carry both pairs of glasses on many occasions (such as when the wearer is moving from indoors to outdoors or when the weather changes) when both pairs may be necessary. The second option is to purchase self-adjusting corrective lenses that adjust in shading according to light intensity. This second option is also expensive and removes the control of the shading from the wearer. In other words, since the lenses automatically shade adjust, it may occur that the glasses adjust darker when the wearer would prefer that they were lighter and/or that the glasses may adjust lighter when the wearer would prefer that they were darker. The third option is to purchase a pair of "clip-on" sunglasses that clip on or in some other way attach to the regular corrective glasses. This option is also relatively expensive and has other disadvantages as well. One disadvantage is that clip-ons may not be considered attractive. This may be especially true when the sunglasses are not desired and are therefore "flipped up" above the corrective glasses. Alternately, the clip-ons may be removed from the corrective glasses but this creates the problem of carrying two pairs of glasses as discussed above. Additionally, clip-ons are typically rigid and may easily crack or break.

U.S. Pat. No. 5,464,094 to La Haye demonstrates that corrective "stick-on" lenses are known. The stick-on lenses are adhered to the inside surface of non-corrective lenses and are not intended to protect eyes but rather to correct vision. One problem with these stick-on lenses is that they cover only a small portion of the base non-corrective lens and thus are not intended to shade nor are capable of shading eyes from the sun.

What is needed is a simple, inexpensive way to convert corrective eyeglasses into corrective sunglasses. Applicant has met this need with a lens cover that is selectively adherable to the innner or outer surface of a corrective lens. By selectively adherable it is meant that the lens cover may be adhered to and removed from the lens as often as is necessary. To convert the sunglasses back to non-shaded corrective glasses it is only necessary to remove the lens covers and place them into a carrying case for future use.

As shown in U.S. Pat. No. 4,955,709 to Smith, it is also known to provide an eyeglass lens with a "one-way" display that permits clear vision to a wearer while providing for a design to be visible to other persons. Smith discloses eyeglass lenses made of a perforated material having a pattern of small holes. The problem with the glasses provided by Smith occurs when the wearer desires to change the display shown to others and/or to change the amount of sun shading provided. The only way provided by Smith to make such adjustments is to replace the original lenses with new lenses. This has the disadvantage of being expensive and requiring the wearer to carry two or more pairs of lenses.

What is needed is a simple, inexpensive way to convert ordinary eyeglasses into one-way glasses that provide clear vision to the wearer and a design to other persons. Applicant has met this need with a lens cover that is selectively adherable to the outer surface of an ordinary lens. This lens cover provides the required one-way vision. To convert the one-way glasses back to ordinary glasses it is only necessary to remove the lens covers and place them into a carrying case for future use.

U.S. Pat. No. 5,764,333 to Somsel discloses a method and kit for making sunshields for eyeglasses. Silhouettes of the lenses are cut out from a sheet of writing material and are then placed onto a plastic film where the sunshields are cut out. Somsel's method has disadvantages. One disadvantage is that the template formed from the writing material will not adhere to the lens material. Thus, the template is likely to slip on the lens material causing inaccurate transfer of the lens shape.

Another disadvantage to the Somsel method is related to the fact that Somsel's method requires two sheets of material—a sheet of writing material and a sheet of plastic film. Each sheet must be cut out to form first the silhouette then the sunshield. This duplication in sheets of material and cutting introduces opportunities for error and also requires excess time. Applicant's method requires only one sheet and only one cut to form a lens cover. Thus, the accuracy is improved and the time required to form a lens cover is reduced.

Another disadvantage to the Somsel method is related to the fact that each silhouette is made by laying the eyeglasses on the sheet of writing material and then tracing around each lens onto the writing material. The problem is that when tracing the eyeglasses the maker must trace around not only the lens but also the portion of the eyeglass frame that holds the lens. Thus, each silhouette is made too large for the lens and must be trimmed to the appropriate size to fit the lens. Applicant's method permits that a lens cover is made to the size of the lens without regard to the eyeglass frame. Thus, again accuracy is improved and the time required to form a lens cover is reduced.

Still another disadvantage to the Somsel method is related to the carrying case for carrying the sunshields. In particular, the carrying case is not disclosed to be convenient for storage in a manner readily available to most users. Rather, the Somsel carrying case requires a separate storage location, such as a shirt pocket, for example. Applicant's storage means including the lens covers, on the other hand, fits easily within a credit card sized holder. Thus, the lens covers are stored conveniently and safely within a wallet or purse.

In these ways the difficulties inherent in the art are overcome in a way that is simple, inexpensive and efficient, while providing better and more advantageous results.

SUMMARY OF THE INVENTION

The current invention provides a simple, inexpensive way to selectively modify eyeglasses by adding lens covers. The lens covers may provide sunshade and/or they may provide a design to the eyeglasses. The lens covers can be easily removed from the eyeglasses and stored for future use.

According to one aspect of the invention, a lens cover system is provided. The lens cover system includes a sheet of material suitable for use in covering a first lens, a pin suitable for use in making a first plurality of holes in the sheet of material around the perimeter of the first lens, and some means of cutting (for example, a pair of scissors) the sheet of material along the first plurality of holes thereby creating a first lens cover. The lens cover system also includes a storage apparatus for storing each lens cover. In one embodiment, the storage apparatus includes a specially created card having first and second sides and an envelope of very specific qualities. Each lens cover adheres to opposite sides of the card. The card and lens covers are then placed within the envelope for protection. Preferably, the card and envelope fit within a credit card sized holder for easy and convenient storage.

According to another aspect of the invention, a second embodiment for the storage apparatus is provided. This storage apparatus includes a specially created book having a plurality of pages including first and second outer pages and a middle page. Each lens cover adheres to opposite sides of the middle page. The outer pages are then closed around the middle page for protection. Preferably, the book fits within a credit card sized holder for easy and convenient storage.

According to still another aspect of the invention, a method of making a lens cover is provided. First, a sheet of lens cover material is placed on the lens to be covered. Next, a pin is used to form a plurality of holes in the sheet of material around the perimeter of the lens. In this way the lens cover will be sized to fit the lens without regard to the eyeglass frame. Using a pair of scissors, the sheet of material is cut along the plurality of holes to form the lens cover. After use, the lens cover may then be stored as noted above.

One advantage of the current invention is that ordinary corrective glasses can easily be converted into corrective sunglasses. The sunglasses can be easily converted back into ordinary glasses by removing the lens covers.

Another advantage of the current invention is that specific designs may be added to eyeglasses of any type. The design can be easily removed as desired by the wearer.

Another advantage is that the lens covers of the current invention are flexible, durable, inexpensive and may provide protection from ultra violet radiation.

Another advantage is that the lens covers may, when dark shaded sufficiently, provide a disguise of the person wearing the glasses.

Another advantage of the current invention is that it relives the eyeglass wearer from the embarrassment of having to wear unsightly clip-on lenses in order to obtain the benefits of prescription sunglasses.

Still another advantage is that the lens covers may assist eye care by, for example, providing shading for eyes sensitive to excessive light.

Another advantage of the current invention is that a storage apparatus may be used to store the lens covers when not in use. The storage means protects and keeps the lens covers flat so that they do not become deformed.

Another advantage of the current invention is the fact that the storage mechanism is designed to protect and further impart the static cling properties onto the lens covers. Performance and longevity of the lens covers is thereby improved upon.

Yet another advantage of the current invention is that the storage apparatuses are designed to fit within a credit card sized holder and repel contaminants from the lens covers. Overall performance and convenience of the lens covers is thereby improved. The wearer may conveniently store the lens covers when not in use and is relieved from frequently cleaning the lens covers.

Still another advantage of the current system is that it ensures that the lens covers more accurately fit the lenses of glasses.

Yet another advantage of the current system is that the storage apparatus conveniently fits within a credit card sized holder. The storage apparatus also helps to retard contaminants such as dirt, lint, etc. from becoming adhered to the lens covers. This feature offers the benefit of relieving the wearer from frequently cleaning the lens covers.

Still other benefits and advantages of the invention will become apparent to those skilled in the art to which it pertains upon a reading and understanding of the following detailed specification.

DESCRIPTION OF THE PREFERRED EMBODIMENT

Figure 1:
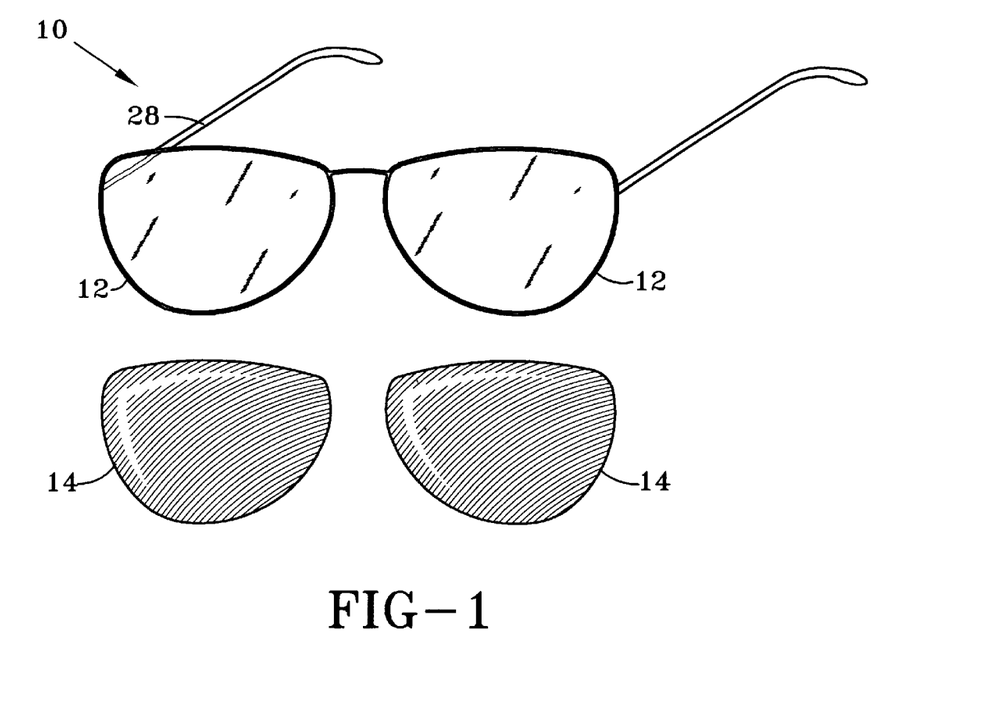
FIG. 1 is a perspective front view of a pair of ordinary corrective eyeglasses with the lens covers of the current invention shown un-adhered to the lenses of the eyeglasses.

Referring now to the drawings wherein the showings are for purposes of illustrating a preferred embodiment of the invention only and not for purposes of limiting the same, FIG. 1 shows a typical pair of eyeglasses 10 adjacent to the lens covers 14 of this current invention. The eyeglasses 10 include a pair of lenses 12 attached in a fashion generally known in the art to a frame 28. The lenses 12 may be corrective lenses (such a prescription lenses, store bought reader lenses, etc.) or may be any other type of lens known in the art. The lens covers 14 of this invention are equally operative with any number of lenses attached in any manner known in the art. The lens covers 14 provide the wearer of eyeglasses two modes of operation. The first mode is the uncovered mode in which no lens cover is provided and thus the lens covers 14 are not required. The second mode is the covered mode in which case the lens covers 14 are easily applied to the outer surface of the eyeglass lenses 12. It should be noted that the lens covers 14 may provide sunshade, may provide a design or may provide other features depending on the material from which the lens covers 14 are made. These features of the lens covers 14 will be discussed further below.

Figure 2:
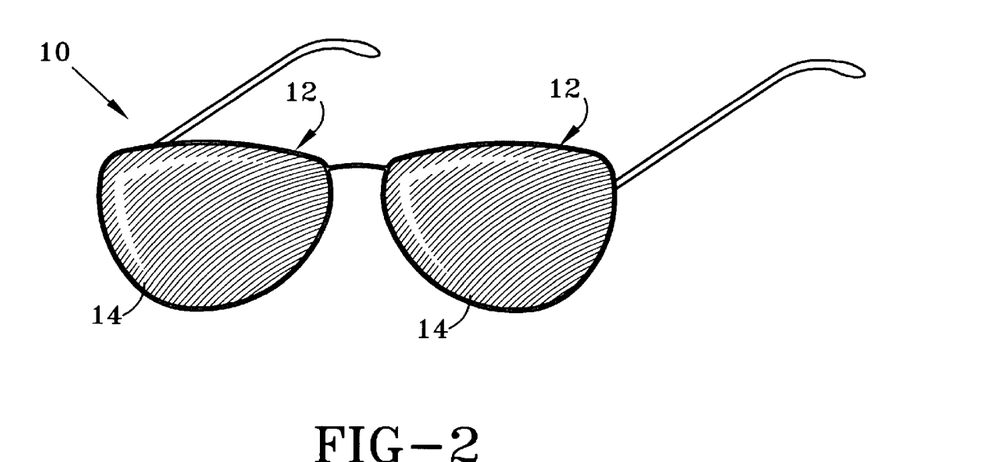
FIG. 2 is a front view of a pair of corrective eyeglasses with the lens covers of the current invention adhered to the lenses of the eyeglasses.

With reference now to FIGS. 1 and 2, to obtain the second, covered mode, the inventive lens covers 14 are simply placed onto the lens 12. When thus placed, the lens covers 14 automatically adhere to the lens 12 using electrostatic cling. To switch to the first, uncovered mode, it is only necessary to remove the lens covers 14 from the lens 12. The electrostatic cling provides reliable adherence for normal use but is easily broken when desired. Thus, the lens covers 14 are selectively adherable to the lens 12 and can be removed from the lens 12 when convenient. For example, if the wearer of the eyeglasses 10 is outdoors and it is sunny, the wearer of the eyeglasses 10 can simply adhere a pair of sunshade lens covers 14 to the lenses 12, thereby effectively converting corrective eyeglasses into corrective sunglasses. Once the sun goes down, the wearer of the glasses can simply remove the lens covers 14 from the lenses 12 thereby converting the corrective sunglasses back to corrective eyeglasses. Because each lens cover 14 is adhered to the corresponding lens 12 by way of static cling, the lens covers 14 may be selectively adhered to and removed from the lenses 12 of the eyeglasses 10 as often as required.

With reference to FIG. 2, it should be noted that the current invention obviates the inherent drawbacks presented to a wearer of corrective eyeglasses given the current state of sunglasses. With the current invention, the wearer of the corrective glasses no longer will be required to carry an alternative pair of corrective sunglasses. Neither will the wearer of the corrective eyeglasses be subjected to the lack of control over the rate of lens cover change involved with self-adjusting corrective eyeglasses which self-adjust to the intensity of surrounding light. The wearer of the corrective eyeglasses will no longer be required to wait for his self-adjusting corrective eyeglasses to lighten upon going indoors or darken upon going outdoors. Rather, the corrective eyeglass wearer can take the sunshade lens covers 14 of the current invention off immediately upon going indoors. Additionally, the wearer of the corrective glasses will no longer be required to purchase and carry around a rigid, easily breakable pair of clip-on sunglasses.

Figure 4:
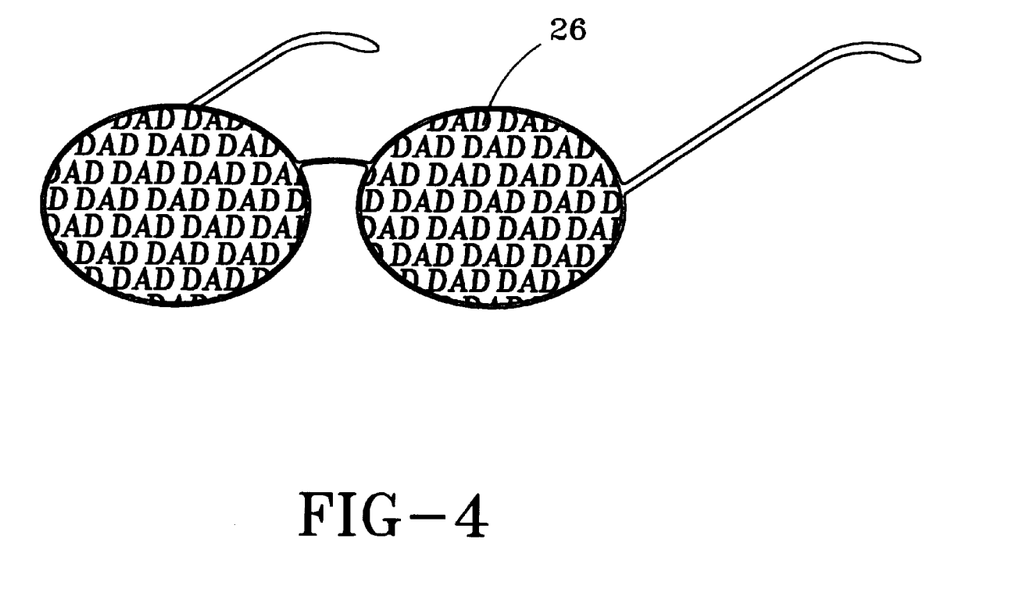
FIG. 4 is a front view of a pair of corrective eyeglasses with the lens covers of the current invention adhered to the outer surfaces of the lenses and having a one-way visually perceptual design thereon.
Figure 5:
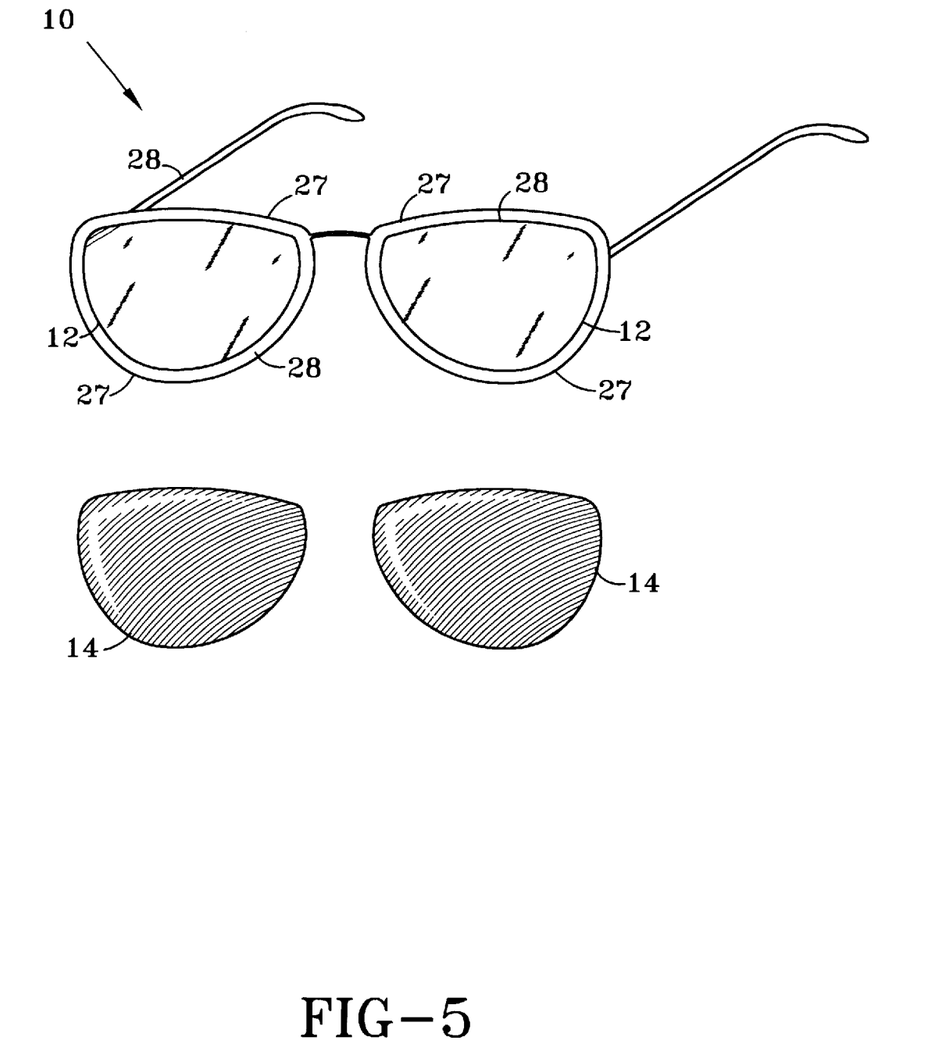
FIG. 5 is a perspective front view of a pair of ordinary corrective eyeglasses showing the portion of the eyeglass frame that holds the lenses with the lens covers of the current invention shown un-adhered to the lenses.
Figure 6:
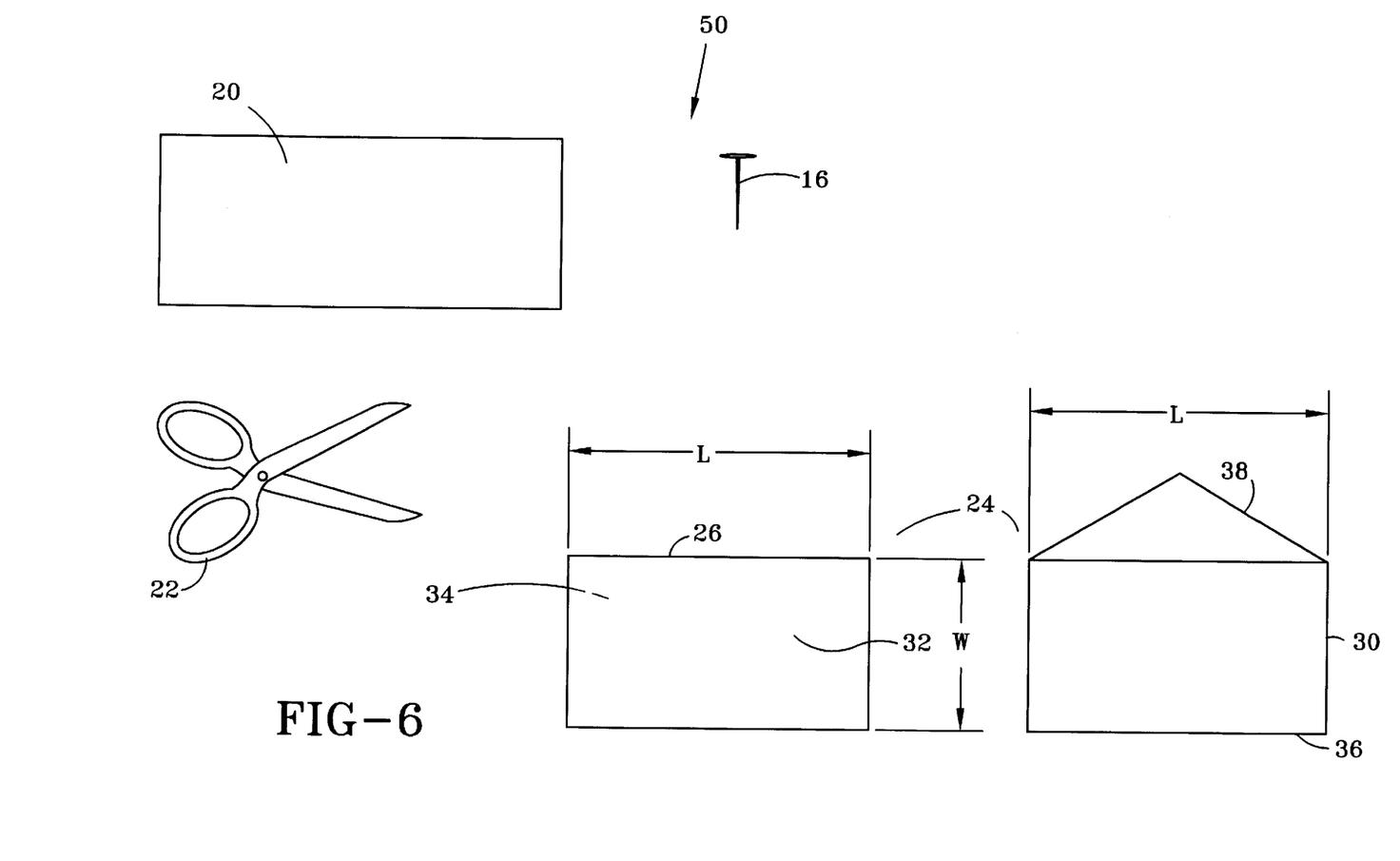
FIG. 6 shows the various elements of the preferred embodiment of the lens cover system.
Figure 7:
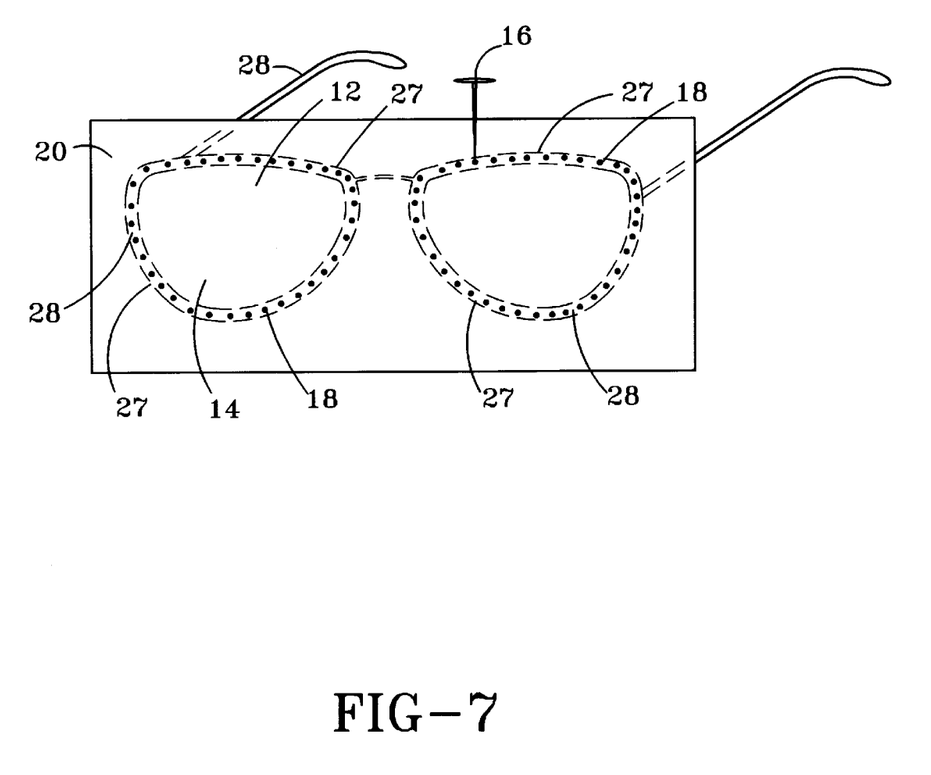
FIG. 7 is a perspective view of a sheet of lens cover material overlying a pair of eyeglasses and showing the shape of the lenses outlined on the sheet of material by a plurality of pinholes.

With reference now to FIGS. 1, 2, 5, 7 and 7, the material from which the lens covers 14 may be made will be discussed. As shown in FIGS. 6 and 7, the lens covers 14 are preferably formed from a sheet 20 of material that can be of any type chosen with sound engineering judgment. In particular applicant contemplates lens covers 14 formed of material to provide sunshading and alternately, or in addition, lens covers 14 formed of material to provide a visible design (FIG. 4). The visible design will be discussed further below. To obtain sunshading performance, preferably the lens covers 14 are formed of a sheet 20 of sunshading film material such as HNS SED-236 film from Hans Industrial Co. Ltd. This is preferred because of its sunshading characteristics, its static cling properties and because it is relatively inexpensive. Additionally, it is durable, flexible, reusable, has a desired degree of opacity, may be polarized and provides protection from ultra violet radiation. Preferably, a high degree (approaching 100%) of the ultra violet radiation is prohibited from passing through the sunshade lens covers 14.

FIG. 4 shows lens covers 14 that provide a visually perceptible design 26. In the preferred embodiment the design 26 is a "one way" design. By one way it is meant that the design 26 is visible to an observer but not by the wearer. Thus, the wearer is able to see through the design 26 from the inside surface of the lens covers 14 while the design 26 is easily perceptible from the outside surface of the lens covers 14. The design 26 remains virtually invisible to the wearer. To obtain the appropriate design 26, the lens covers 14 are preferably formed of a sheet 20 of laser reflective film material such as SL104-D Laser Reflective Film produced by the Top Colour Company. This SL104-D Laser Reflective Film is preferred because it has a direct see through capacity.

Figure 3:
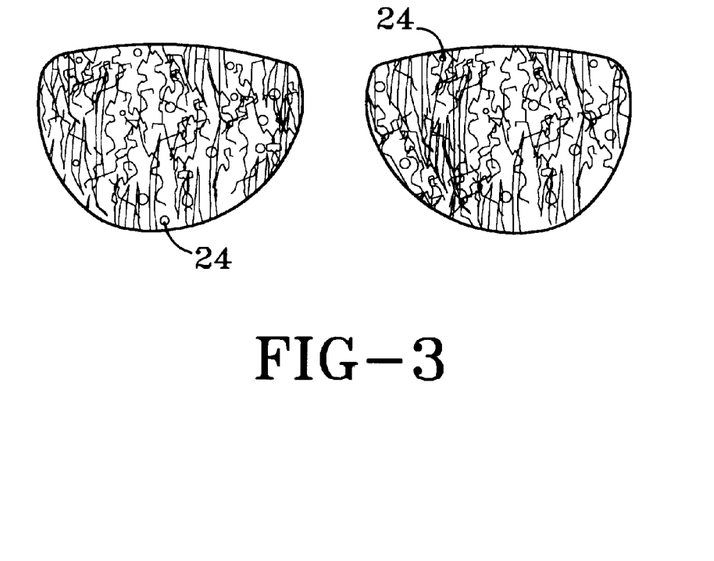
FIG. 3 is a magnified rear view of one embodiment of the lens covers of the current invention.

Referring now to FIG. 3, an alternative technique to obtain the see through design feature of the current invention is depicted. In this technique, the lens covers 14 include a plurality of small openings 24. Preferably the openings 24 have diameters between 0.001 inches and 0.002 inches. Preferably, 50% or more of said first lens cover is perforated with openings having diameters of between 0.001 inches and 0.02 inches. This provides a preferable range of proper viewing properties and performance. Nonetheless, the current invention also envisions less than 50% of said first lens cover being perforated with openings having diameters of between 0.001 inches and 0.02 inches. To form the see through design lens covers 14 by this alternative technique, it is preferred that the lens covers 14 are formed out of 3M Perforated Window Marking Film. This 3M material possesses no shading characteristics, but it does provide ample see through capability.

Note that while the see through capability of the film has been described as occurring through the use of laser reflective film or small openings, other techniques are envisioned by the applicant. Additionally, while the visually perceptible design 26 displayed in FIG. 4 comprises letters, the current invention anticipates any visually perceptible design, such as letters, numbers, figures, etc. or any combination thereof. The applicant also envisions the application of the visually perceptible design onto existing sunglasses. Such an application may merely add the visually perceptible design to the existing sunglasses. Alternatively, this application may also increase the amount of sunshading provided by the existing sunglasses. Another film which may be used to accomplish the foregoing objectives is the Solar Stat Self Clinging Vinyl Window Tinting.

With reference now to FIGS. 6 and 7, a method of covering the lenses 12 with lens covers 14 will now be disclosed. First, an individual lens cover 14 is prepared to fit an individual lens 12. Several methods of accomplishing this preparation are contemplated. Essentially though, the lens shape is transferred onto the sheet 20 and then the lens covers are cut from the sheet 20. Once the lens cover 14 has been prepared, it is only necessary to adhere the lens cover 14 to the outer surface of the lens 12.

Figure 8:
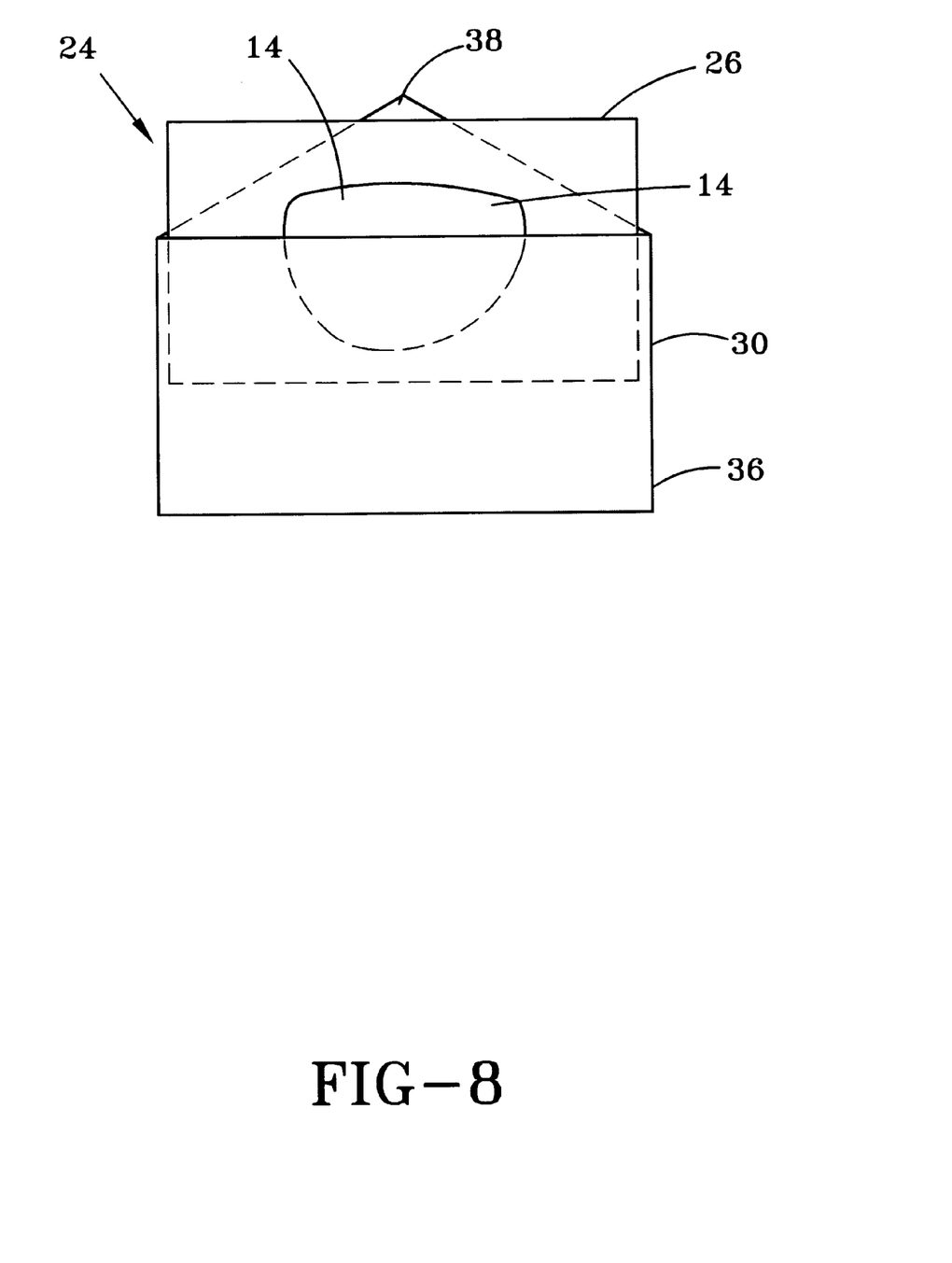
FIG. 8 shows the lens cover system where the lens covers are in the process of being stored in the storage means.

FIGS. 6, 7 and 8 show the basic components for one embodiment of the lens cover system 50. A sheet of material 20 suitable for use in covering the lenses 12 is included. A pin 16 for making a plurality of holes 18 in the sheet of material is also included. The pin allows an outline of each lens 12 to be transferred directly onto the sheet of material 20 (FIG. 7). What should be especially noted is that the plurality of holes 18 are formed precisely at the perimeter of the lenses 12 not at the outer perimeter 27 of the portion of the frame 28 that holds the lens 12. The number of holes 18 required can be as desired by the maker but it is recommended that the holes 18 be made at 0.25 inch intervals in the material 20 around the lens 12. A pair of scissors 22 or other cutting means is then used to cut the material 20 along the plurality of holes 18 thereby forming a lens cover 14.

Because, only the shape of each lens 12 is transferred directly onto the sheet of lens cover material 20, the correct size of the lens covers 14 is ensured. Thus, little if any, subsequent trimming is necessary for an exact fit. The lens cover 14 is then applied to the lens 12 for use.

Figure 9:
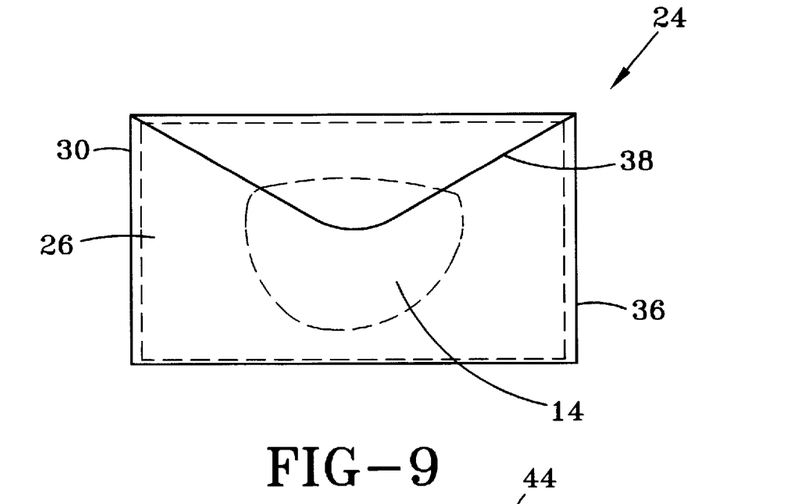
FIG. 9 is a front view of the lens covers stored in the storage means.

With reference now to FIGS. 6, 8 and 9, a first storage means 24 is provided for use in storing and protecting the lens covers 14. The first storage means 24 includes a specially created card 26 and a specially created envelope 30 each having very specific performance criteria. The card 26 has first 32 and second 34 sides. Preferably, the lens covers 14 are selectively adhere able to each side of the card 26. In the preferred embodiment, one lens cover 14 is adhered to each side of the card 26. The envelope 30 selectively receives the card 26 both when the lens covers 14 are and are not adhered to the card 26. In the preferred embodiment the card 26 and envelope 30 are substantially the size of a credit card and fit within a credit card holder. By credit card holder it is meant a cavity or the like commonly found in wallets, purses, etc. wherein credit cards may be held. These compartments typically have a standardized size. This size corresponds to the credit card industry's sizing of its credit cards. These compartments allow credit cards, drivers licenses, etc. to fit within them. These compartments, as well as the storage means disclosed herein, adapt to the size of credit cards as credit card manufactures vary the size of credit cards. Preferably, both the card 26 and the envelope 30 have a length L less than or equal to 3.5 inches and a width W less than or equal to 2.2 inches. This allows the storage means 24 and lens covers 14 to be very conveniently stored within the credit card holder of a wallet or purse, for example.

With continuing reference to FIGS. 6, 8 and 9, preferably the envelope has a main body 36 and a flap 38. The flap 38 is pivotally connected to the main body 36 and is able to close over the card 26 when the card 26 is completely received by the envelope 30. The envelope 30 thereby fully encases and protects the card 26 as well as the lens covers 14 when the lens covers are adhered to the card 26. Preferably, at least the interior of the envelope 30 is made of a spunbonded olefin, such as Dupont Tyvek. This is a 100% high density polyethylene naturally white opaque material containing no fillers or pigments. Each side 32, 34 of the card 26 preferably has a polished ultra violet laminated finish. The card 26 could be core printed and ultra violet laminated. These materials provide optimum performance of the current invention. The lens covers 14 are selectively adhere able to the card 26 but not the interior of the envelope 30. Thus, the lens covers will not get stuck in the envelope. Rather, they will remain flatly adhered to the card 26 even as the card is being removed from the envelope 30. Additionally, the lens covers 14 will not become bent or deformed while adhered to the card 26 and stored in the envelope 30. Moreover, the envelope will serve to repel outside contaminants such as dirt, lint and the like from affecting the lens covers 14.

Figure 10:
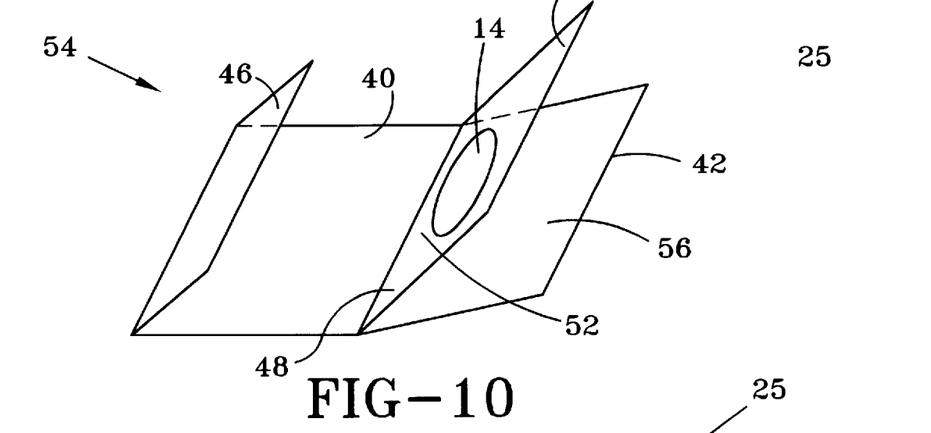
FIG. 10 is a perspective view of an alternative embodiment of the storage means of the current invention.
Figure 11:
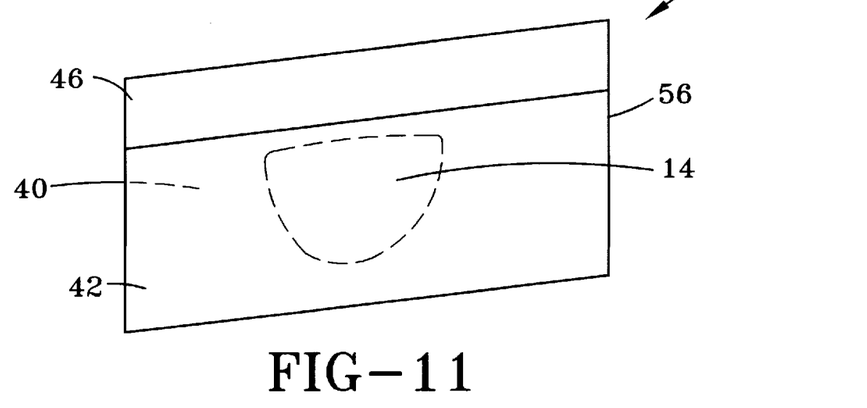
FIG. 11 is a front view of the system where the lens covers are stored in the alternative embodiment of the storage means

With reference now to FIGS. 10 and 11 a second storage means 25 is provided for use in storing and protecting the lens covers 14. The second storage means 25 is a book 54 with a plurality of pages including first 40 and second 42 outer pages and a middle page 44. Each of the plurality of pages are pivotally connected to the other pages as books are well known to do. The middle page 44 has first 48 and second 52 sides. Preferably, like each side 32, 34 of the card 26, these sides 48, 52 are coated with an ultra violet laminated finish. This promotes the desired adhesion of the lens covers to the middle page 44. As with the card 26, the lens covers 14 are then selectively adherable to the sides 48, 52 of the middle page 44. And, like the envelope 30, the first 40 and second 42 outer pages selectively enclose the first 48 and second 52 sides respectively of the middle page 44 for protection.

With continuing reference to the FIGS. 10 and 11, the book 54, like the envelope 30, has a flap 46. The flap 46 is pivotably connected to the first outer page 40. The flap 46 is able to close over the book 54 and contact an outer surface 56 of the second outer page 42 when the first 40 and second 42 outer pages enclose the first 48 and second 52 sides of the middle page 44. In this fashion, the lens covers 14 are fully encased and protected by the second storage means 25. The lens covers 14 are selectively adhereable to the sides 48, 52 of the middle page 44 and do not stick to the outer pages 40, 42. Because the lens covers 14 adhere to the middle page in a fashion similar to the way that they adhere to the lenses 12, the lens covers 14 do not wrinkle while being adhered to the middle page 44. Rather, the lens covers remain flatly adhered to the middle page 44 of the book 54. This is true even when the book 54 is opened. The lens covers 14 will remain adhered to the middle page 44 rather than adhering to the outer pages 40, 42 as the book 54 is opened. This second storage means 25 also fits conveniently within a credit card holder. Finally, the first 40 and second 42 outer pages serve to repel outside contaminants such as dirt, lint and the like from infecting the lens covers 14.

With reference to FIGS. 1, 2, 5, 6 and 7, a method of using the lens cover system 50 will now be discussed. First, the sheet of shading material 20 is laid over the lenses 12 of the pair of glasses 10. The pin 16 is used to create a series of holes 18 in the sheet of material 20 around the perimeter of each lens 12. Note that, preferably, the perimeter of each lens is outlined on the sheet of material 20, not the outline of the frame that houses each lens 12. This is accomplished by punching the pin through the sheet of material between the frame 28 and the perimeter of each lens 12. The sheet of material is then removed from the glasses and the lens covers 14 are cut out of the sheet of material by cutting along the plurality of holes 18 with scissors 22 or the like. The lens covers 14 may then be applied to the lenses 12 as necessary.

With reference to FIGS. 6, 8 and 9, when the lens covers 14 are not in use they are stored in the first storage means 24 as follows. The lens covers 14 are removed from the lenses 12 and adhered to the first 32 and second 34 sides of the card—one lens cover 14 on each side. The card 26 is then placed into the envelope 30 and the flap 38 of the envelope 30 is closed thereby fully encasing the card 26 and the first and second lens covers within the envelope 30. With reference to FIGS. 10 and 11, utilizing the second storage means 25, the lens covers 14 are removed from the lenses 12 and adhered to the first 48 and second 52 sides of the middle page 44. The first 40 and second 42 outer pages are then closed against the middle page 44. Finally, the flap 46 is pivoted with respect to the first outer page 40 so that the flap contacts an outer surface 56 of the second outer page 42. Either embodiment of the storage means may then be conveniently stored in a credit card holder or the like.

With reference now to FIGS. 1–11, in a practical application of the current invention, the wearer of corrective eyeglasses may attend a sporting event. The event may be outdoors in bright sunlight. In an effort to simultaneously support his team and shade his eyes from sunlight and ultraviolet radiation while maintaining his ability to see through his corrective eyeglasses, the wearer of corrective eyeglasses would obtain a sheet 20 of lens cover material. The sheet 20 may have his team's logo upon it. The wearer of the corrective glasses would then form the required lens covers 14 from the sheet 20 as described above. Alternatively, the buyer may simply purchase preformed lens covers 14. The lens covers 14 are then adhered to the wearer's corrective eyeglasses. The wearer would then have corrective sunglasses which comprises a logo of his favorite team thereon. Once the sun goes down, the wearer would merely remove the lens covers 14 from his corrective eyeglasses and place them into the storage means 24. Thus, inexpensive, lightweight, durable, flexible, selectively adhereable, lint free, ultra violet protecting lens covers for corrective eyeglasses are readily available to the wearer of the corrective eyeglasses whenever he needs them.

With continuing reference to FIGS. 1–11, in another practical application of the current invention, the wearer of glasses (including corrective eyeglasses, sunglasses or any other type of glasses) may desire to add a design 26 to his glasses as discussed above. In this case the wearer would obtain the appropriate sheet 20 of material and form the required lens covers 14 as described above. The lens covers 14 would then be adhered to the lenses 12 thereby providing the desired design 26. In this way any pair of glasses can be provided with a "vanity" feature that can be easily installed and easily removed as the wearer desires.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A lens cover system comprising:

a sheet of material suitable for use in covering a first lens;

a pin suitable for use in making a first plurality of holes in said sheet of material around the perimeter of said first lens;

cutting means for cutting said sheet of material along said first plurality of holes thereby creating a first lens cover; and, storage means for storing said first lens cover, said storage means including, A) a card having first and second sides, said first lens cover being selectively adhereable to said first side of said card; and, B) an envelope that selectively receives said card and said first lens cover.

2. The system of claim 1 wherein said card is substantially the size of a credit card and said first and second sides of said card are coated with an ultra violet laminated finish.

3. The system of claim 2 wherein said envelope fits within a credit card sized holder.

4. The system of claim 3 wherein:

said sheet of material is suitable for use in covering a second lens;

said pin is suitable for use in making a second plurality of holes in said sheet of material around the perimeter of said second lens;

said cutting means is also for cutting said sheet of material along said second plurality of holes thereby creating a second lens cover;

said second lens cover is selectively adhereable to said second side of said card; and, said envelope also selectively receives said second lens cover.

5. The system of claim 4 wherein said envelope comprises:

a main body; and, a flap pivotably connected to said main body, said envelope fully encasing said card when said flap is in a closed position.

6. The system of claim 5 wherein:

said envelope is formed of a spunbonded olefin; and, said first lens cover is non-adhereable to an inner surface of said envelope.

7. The system of claim 6 wherein said card has a length L less than or equal to 3.5 inches and a width W less than or equal to 2.2 inches.

8. A method of making and storing a first lens cover, the method comprising the steps of:

providing a first lens;

providing a lens cover system that includes a sheet of material suitable for use in covering said first lens, a pin suitable for use in creating holes in said sheet of material, cutting means for cutting said sheet of material along said holes, and storage means including a card having first and second sides and an envelope that selectively receives said card;

placing said sheet of material on said first lens;

making a first plurality of holes in said sheet of material around the perimeter of said first lens with said pin;

removing said sheet of material from said first lens;

cutting along said first plurality of holes with said cutting means thereby creating a first lens cover;

adhering said fist lens cover to said first side of said card; and, placing said card and said first lens cover within said envelope.

9. The method of claim 8 also for making and storing a second lens cover, the method further comprising the steps of:

placing said first lens cover on said sheet of material;

cutting said sheet of material around said first lens cover with said cutting means thereby creating a second lens cover;

removing said first lens cover from said second lens cover;

adhering said second lens cover to said second side of said card; and, placing said second lens cover within said envelope.

10. The method of claim 9 wherein said envelope comprises a main body and a flap pivotably connected to said main body, the method further comprising the step of:

closing said flap thereby fully encasing said card and said first and second lens covers within said envelope.

11. The method of claim 8 also for making and storing a second lens cover, the method further comprising the steps of:

providing a second lens;

placing said sheet of material on said second lens;

making a second plurality of holes in said sheet of material around the perimeter of said second lens with said pin;

removing said sheet of material from said second lens;

cutting along said second plurality of holes with said cutting means thereby creating a second lens cover;

adhering said second lens cover to said second side of said card; and, placing said second lens cover within said envelope.

12. The method of claim 8 wherein said first lens is held within a frame, said step of making a first plurality of holes in said sheet of material around the perimeter of said first lens with said pin, comprises the step of:

making said first plurality of holes in said sheet of material between said frame and the perimeter of said first lens.

13. A lens cover system comprising:

a sheet of material suitable for use in covering a first lens;

a pin suitable for use in making a first plurality of holes in said sheet of material around the perimeter of said first lens;

cutting means for cutting said sheet of material along said first plurality of holes thereby creating a first lens cover; and,     storage means for storing said first lens cover, said storage means comprising a book with a plurality of pages including first and second outer pages and a middle page, each of said plurality of pages being pivotably connected to the other said plurality of pages, said middle page having first and second sides, said first lens cover being selectively adherable to said first side of said middle page, said first and second outer pages selectively enclosing said first and second sides of said middle page respectively.

14. The system of claim 13 wherein said sheet of material is suitable for use in covering a second lens;

said pin is suitable for use in making a second plurality of holes in said sheet of material around the perimeter of said second lens;

said cutting means is also for cutting said sheet of material along said second plurality of holes thereby creating a second lens cover; and,     said second lens cover is selectively adherable to said second side of said middle page.

15. The system of claim 14 wherein said book further comprises:

a flap pivotably connected to said first outer page, said flap contacting an outer surface of said second outer page when said first and second outer pages enclose said first and second sides of said middle page; and,     said first and second sides of said middle page are coated with an ultra violet laminated finish.

16. A method of making and storing a first lens cover, the method comprising the steps of:

providing a first lens;

providing a lens cover system that includes a sheet of material suitable for use in covering said first lens, a pin suitable for use in creating holes in said sheet of material, cutting means for cutting said sheet of material along said holes, and storage means including a book with a plurality of pages including first and second outer pages and a middle page, each of said plurality of pages being pivotably connected to the other said plurality of pages, said middle page having first and second sides;

placing said sheet of material on said first lens;

making a first plurality of holes in said sheet of material around the perimeter of said first lens with said pin;

removing said sheet of material from said first lens;

cutting along said first plurality of holes with said cutting means thereby creating a first lens cover;

adhering said first lens cover to said first side of said middle page; and,     closing said first and second outer pages against said middle page.

17. The method of claim 16 also for making and storing a second lens cover further comprising the steps of:

providing a second lens;

making a second plurality of holes in said sheet of material around the perimeter of said second lens with said pin;

removing said sheet of material from said second lens;

cutting along said second plurality of holes with said cutting means thereby creating a second lens cover; and,     adhering said second lens cover to said second side of said middle page.

18. The method of claim 17 wherein said book further comprises a flap pivotably connected to said first outer page, the method after the step of closing said first and second outer pages against said middle page, further comprising the step of:

contacting said flap to an outer surface of said second outer page.

19. The method of claim 16 wherein said first lens is held within a frame, said step of making a first plurality of holes in said sheet of material around the perimeter of said first lens with said pin, comprises the step of:

making said first plurality of holes in said sheet of material between said frame and the perimeter of said first lens.

\* \* \* \* \*